(12) United States Patent
Dahl

(10) Patent No.: US 9,590,408 B2
(45) Date of Patent: Mar. 7, 2017

(54) DEVICE FOR GROUNDING

(71) Applicant: Fredrik Dahl, Varberg (SE)

(72) Inventor: Fredrik Dahl, Varberg (SE)

( * ) Notice: Subject to any disclaimer, the term of this patent is extended or adjusted under 35 U.S.C. 154(b) by 12 days.

(21) Appl. No.: 14/524,951

(22) Filed: Oct. 27, 2014

(65) Prior Publication Data

US 2015/0083453 A1  Mar. 26, 2015

Related U.S. Application Data

(63) Continuation-in-part of application No. 13/138,919, filed as application No. PCT/SE2010/000089 on Apr. 6, 2010, now Pat. No. 8,878,057.

(30) Foreign Application Priority Data

Apr. 27, 2009  (SE) .................................. 0900565-3

(51) Int. Cl.
*H01R 4/66* (2006.01)
*H02G 13/00* (2006.01)

(52) U.S. Cl.
CPC ............... *H02G 13/00* (2013.01); *H01R 4/66* (2013.01)

(58) Field of Classification Search
CPC .......... H01B 1/00; H01B 5/00; H01B 7/0009; H01B 5/08; H01B 5/104; H01B 5/12; H01R 4/66; H01R 9/0512; H02B 5/01; H02G 13/00
USPC ..................................................... 174/126.1
See application file for complete search history.

(56) References Cited

U.S. PATENT DOCUMENTS

| | | | | |
|---|---|---|---|---|
| 3,255,300 | A * | 6/1966 | Bunish et al. | ................ 174/130 |
| 4,106,299 | A * | 8/1978 | Fujii | .............................. 405/303 |
| 4,980,517 | A * | 12/1990 | Cardas | ................ H01B 7/0009 |
| | | | | 174/129 R |

(Continued)

FOREIGN PATENT DOCUMENTS

| | | |
|---|---|---|
| JP | 2000-243141 (A) | 9/2000 |
| JP | 2008-251267 (A) | 10/2008 |
| WO | WO 95/27989 (A1) | 10/1995 |

OTHER PUBLICATIONS

U.S. Notice of Allowance dated Jul. 8, 2014 in U.S. Appl. No. 13/138,919.

(Continued)

*Primary Examiner* — Angel R Estrada
*Assistant Examiner* — Pete Lee
(74) *Attorney, Agent, or Firm* — McGinn IP Law Group, PLLC

(57) ABSTRACT

A device for establishing grounding of an installation of different types includes one or more cables, wherein a ground rail or a ground conductor, ground rails or ground conductors, or a ground point or ground points are grounded by the one or more cables including a combination of electrically conductive wires or conductors in at least one inner core and at least one outer layer which surrounds the inner core wholly or partly, and a bore extending, in at least one of ground and a rock, with a depth of more than 100 m. The one or more cables are laid in the bore. The electrically conductive wires or conductors in the at least one inner core include hundreds of thin conductors surrounded by the at least one outer layer that includes coarse conductors having a diameter at least two times more than a diameter of the thin conductors.

17 Claims, 2 Drawing Sheets

(56) References Cited

U.S. PATENT DOCUMENTS

| | | | |
|---|---|---|---|
| 5,171,942 A | 12/1992 | Powers | |
| 6,140,589 A * | 10/2000 | Blackmore | H01B 7/0009 |
| | | | 174/128.1 |
| 7,027,008 B2 * | 4/2006 | Baker | 343/890 |
| 7,228,627 B1 * | 6/2007 | Yoshimura | H01B 5/104 |
| | | | 174/108 |
| 7,326,854 B2 | 2/2008 | Varkey | |
| 8,525,033 B2 * | 9/2013 | Grether | D07B 1/02 |
| | | | 174/128.1 |
| 2006/0254793 A1 | 11/2006 | Lopez et al. | |

OTHER PUBLICATIONS

U.S. Office Action dated Mar. 20, 2014 in U.S. Appl. No. 13/138,919.
U.S. Office Action dated Nov. 19, 2013 in U.S. Appl. No. 13/138,919.
U.S. Office Action dated Aug. 6, 2013 in U.S. Appl. No. 13/138,919.
U.S. Office Action dated Feb. 1, 2013 in U.S. Appl. No. 13/138,919.

\* cited by examiner

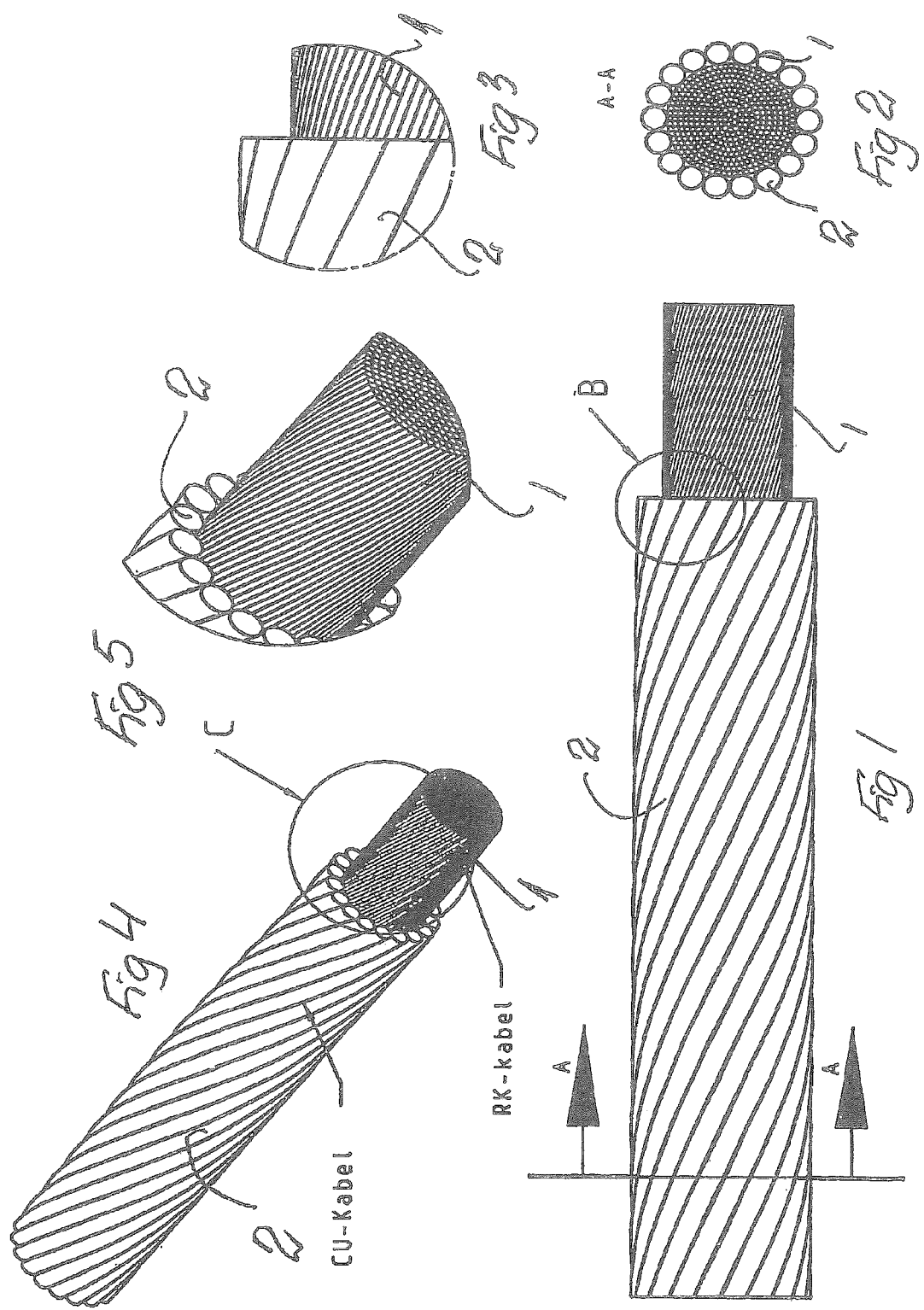

DEVICE FOR GROUNDING

The present application is a Continuation-In-Part Application of U.S. patent application Ser. No. 13/138,919, filed on Oct. 24, 2011, which is based on International Application No. PCT/SE2010/000089, filed on Apr. 6, 2010, which is based on the Swedish Patent Application No. 0900565-3, filed on Apr. 27, 2009, the entire contents of which are incorporated herein by reference. the entire contents of which are incorporated herein by reference.

BACKGROUND OF THE INVENTION

The present invention relates to a device for establishing efficient grounding of installations of different types, e.g. of low tension and/or high tension current type and/or high voltage type, an antenna installation or a teleinstallation or combinations thereof, and a method of reducing the device into practice.

For maintaining as disruption-free operation as possible in electric installations of different types, e.g. low tension or high tension current type and/or high voltage type, in particular with extensive electronic equipment, computers, wireless networks, wireless telephones etc., an antenna installation of a teleinstallation or combinations of such installation, increasingly stringent demands are being placed on an efficient grounding of the installation for avoiding overtones and high impedances, which increase considerably at high frequencies. Thus, there is a large need in the art for a device for more efficient grounding of such installations than has hitherto been possible using conventional grounding devices.

SUMMARY OF THE INVENTION

The task forming the basis of the present invention is to satisfy the above-outlined needs in the art.

This task is solved according to the present invention in the device indicated by way of introduction, in that the device has been given the characterizing features as set forth in the claimed invention.

A device according to the present invention makes possible an extremely efficient grounding of an installation of the type disclosed by way of introduction in that substantially all overtones are deflected to earth. The deflection with the cable combination according to the present invention will be extremely efficient and has proved to make it possible for persons supersensitive to electricity to stay in a prototype installation according to the present invention. By means of a device according to the present invention, earth or ground fault currents, vagabond currents and electromagnetic fields are reduced or even totally eliminated.

One embodiment of the present invention will now be described in greater detail hereinbelow with reference to the accompanying Drawing.

BRIEF DESCRIPTION OF THE DRAWINGS

FIG. 1 shows a side elevation of a part of a device according to one embodiment of the present invention.

FIG. 2 shows a section through the part according to FIG. 1 in the direction of the arrows A-A.

FIG. 3 shows, on a larger scale, the part enclosed by a circle in FIG. 1.

FIG. 4 is a perspective view of the part of a device according to the present invention illustrated in FIG. 1.

FIG. 5 shows, on a larger scale, the part of the device according to the present invention enclosed by a circle in FIG. 4.

DESCRIPTION OF EMBODIMENTS

Figure 6:
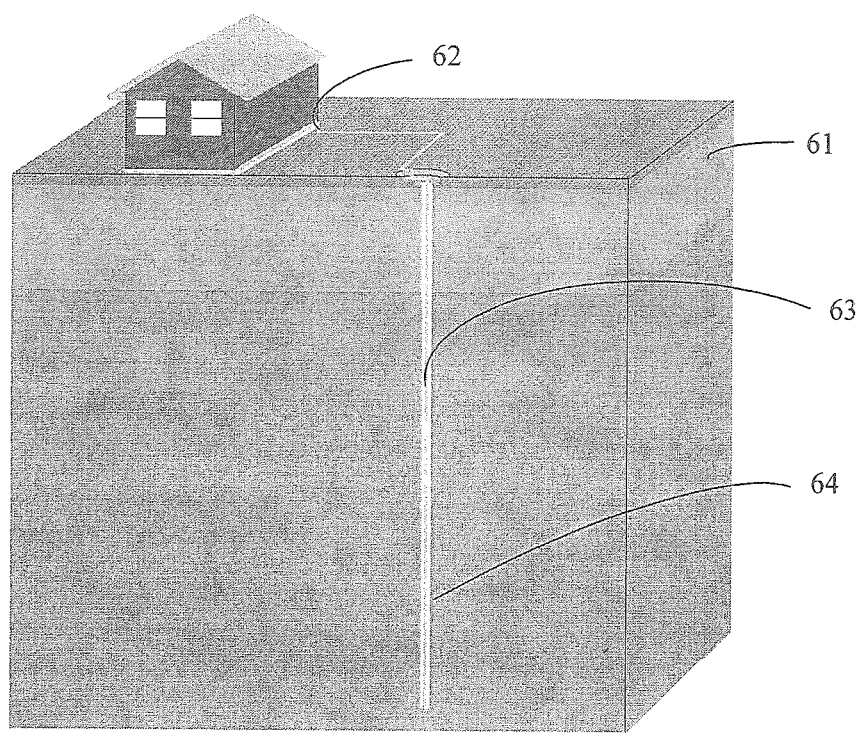
FIG. 6 shows grounding of a ground conductor with a cable laid in a bore in ground.

The part of a cable combination according to the present invention illustrated in FIG. 1 is merely a small part of a cable which is hundreds of meters in length. The device includes one or more cables, in which the ground rail or ground conductor, ground rails or ground conductors or ground point or ground points of the installation being grounded by the one or more cables.

The cable includes an inner core 1 which is surrounded by an outer layer 2. The inner core 1 includes a large number of twisted relatively thin wires. The outer layer 2 surrounding the core 1 includes a sufficient number of thicker wires for enclosing the inner core 1 formed by the thin wires.

The wires in the inner core 1 are solid copper wires having an approximate diameter of 0.5 mm. The wires in the outer layer 2 are solid copper wires with an approximate diameter of 2.2 mm. The surface area of the inner core 1 is substantially equally as large as the surface area of the surrounding outer layer 2. In one embodiment, the surface area of the inner core was approx. 70 mm$^2$ and the outer layer 2 have a surface are or approx 70 mm$^2$. The number of wires in the inner core 1 amounts to approximately 370, while the number of wires in the outer layer 2 is approximately 18. The number of wires in the inner core 1 is of particular importance for deflecting overtones, since these occur in the surface or outer layer of every conductor.

In an exemplary embodiment, the number of conductors in the inner core is approximately more than twenty times the number of conductors in the outer layer.

A cable combination according to the present invention may also be designated CU-RK combicable. Apart from being electrically conductive, the outer layer 2 also fulfils the function of protecting the inner core 1 from a mechanical viewpoint.

One particularly effective method of using the cable combination according to the present invention described in the foregoing is, from the zero rail or zero point of the electric installation, to lead the cable combination to a bore of a depth of approx. 240 m in order to make good contact with water in the bore. It is suitable to provide the bore with a lining tube or pipe to a depth of approx. 36 m and to connect the cable combination to the lining tube in careful electrically conductive fashion. The depth of the bore is of importance to avoid overtones and fields which are close to superficial parts of ground and rock. The deeper the bore, the greater part of the cable will be located in water.

In a prototype installation according to the present invention, such an extraordinary measurement value as 0.04 microwatt per square meter in air was achieved at a frequency of 800-2500 MHz. Further, in the installation a resistance in the ground conductor was measured of 0.08 ohm and even lower. This resistance was measured using an instrument entitled "Earth clamp tester" from Kyoritsu Model 4002 Kew Earth. Moreover, the electromagnetic field was measured to 0.02 microtesla at a frequency of 50 Hz and 0.05 microtesla at the frequency of between 5 and 2000 Hz. The earth's own magnetic field is 0.02 microtesla.

The cable combination according to the present invention may contain other electrically conductive material than copper or combinations thereof if such is deemed appropriate.

An exemplary aspect of the present invention uses two different cables A and B.

The cable A has an area of about 70 mm² and includes about 320 thin wires with a diameter of about 0.51 mm in the inner core surrounded by an outer layer with about 18 coarse wires having a diameter of about 2.22 mm.

The cable B has an area of about 120 mm² and includes about 544 thin wires with a diameter of about 0.51 mm in the inner core surrounded by an outer layer with about 19 coarse wires having a diameter of about 2.22 mm.

Further, another exemplary aspect of the present invention uses a cable with an area of 240 mm².

It is also possible to have two cables A+A, B+B, A+B, B+A, or even three A+A+B or A+B+B so that there will be two or more cables in one and the same bore.

An exemplary task of the present invention is to realize operations as free from interference as possible in different types of electric plants with a device for more effective grounding than what is possible with known conventional grounding devices. By the new type of grounding according to the present invention, the above risks decreases or are even eliminated.

According to the present invention it is important to use a cable having as many conductors as possible as harmonics propagate in the outer sheath of each conductor. What is achieved with this is a good conductivity of harmonics. Something else that is of utmost importance is that the cable is put down into a deep drill hole so that the leakage/discharge of the harmonics is working. In order to be able to place a multi-conductor down into a drill hole, some type of mechanical protection that also provides a stabilizing and leakage effect is required; otherwise, it is impossible to get the cable down into the drill hole. It is also so that the depth of the drill hole is decisive for the discharge/leakage effect.

Because the deeper the drill hole, the greater becomes the bearing/leakage surface/contact surface between the water and the cable. Just placing the cable according to the present invention in the ground and connecting to an earth point does not give the desired effect as the ground close to the surface is so saturated by harmonics that the ground cannot accept what the cable can divert.

The depth of the hole is important. The cable is developed to run from the earth point, e.g., potential equalization bus, and in one and the same length all the way down into the drill hole. In a preferred embodiment of the present invention, the number of thin/inner conductors amounts to 370 and the number of coarse/outer conductors 2 amounts to 18.

Placed down in a deep drill hole and connected to, e.g., a potential equalization bus in an entire length, an amazingly effective grounding is achieved from 0.08Ω down to 0.01Ω. This makes sure that there is no risk of the occurrence of an aerial effect in the earth conductor, which is common with today's conventional grounding technique.

As shown in FIG. 6, in an exemplary aspect of the present invention, a ground conductor 62 is grounded by cable 63 in bore 64 of ground 61.

The main part of the bore might be filled with water which enters the bore during the drilling of the same. It is also possible to improve the conductivity between cable 63 in the bore 64 and the surrounding ground 61 by introduction of a material that improves the conductivity between cable 63 and ground 61.

Many modifications are conceivable without departing from the scope of the inventive concept as defined in the claimed invention.

What is claimed is:

1. A device for establishing grounding, said device comprising:
one or more cables, wherein a ground rail or a ground conductor, ground rails or ground conductors, or a ground point or ground points are grounded by the one or more cables comprising a combination of electrically conductive wires or conductors in at least one inner core and at least one outer layer which surrounds the inner core wholly or partly; and wherein the electrically conductive wires or conductors in said at least one inner core include hundreds of thin conductors surrounded by said at least one outer layer that includes coarse conductors having a diameter at least two times more than a diameter of the thin conductors, and wherein a ratio of a number of the thin conductors to a number of the coarse conductors is approximately 370/18.

2. The device as claimed in claim 1, wherein the wires or conductors in the inner core have substantially a same diameter and the wires or conductors in the outer layer surrounding the inner core have substantially a same diameter, which is larger than the diameter of the wires or conductors in the inner core.

3. The device as claimed in claim 2, wherein a surface area of all of the wires or the conductors in the core is substantially equal to a surface area of all of the wires or the conductors in the outer layer wholly or partly surrounding the inner core.

4. The device as claimed in claim 3, wherein a number of the wires or conductors in the inner core is greater than a number of the wires or conductors in the outer layer wholly or partly surrounding the inner core.

5. The device as claimed in claim 2, wherein the wires or the conductors in the inner core are solid and the wires or the conductors in the outer layer wholly or partly surrounding the inner core are solid.

6. The device as claimed in claim 4, wherein the wires or the conductors in the inner core and the outer layer wholly or partly surrounding the inner core comprise copper wires or copper conductors.

7. The device as claimed in claim 6, wherein the ground conductor or the ground conductors are electrically conductively interconnected to an electrically conductive lining tube or pipe in at least an upper region of the bore.

8. The device as claimed in claim 7, wherein the lining tube or pipe extends to a depth of more than 20 m.

9. The device as claimed in claim 3, wherein the wires or the conductors in the inner core are solid and the wires or the conductors in the outer layer wholly or partly surrounding the inner core are solid.

10. The device as claimed in claim 4, wherein the wires or the conductors in the inner core are solid and the wires or the conductors in the outer layer wholly or partly surrounding the inner core are solid.

11. The device as claimed in claim 5, wherein the wires or the conductors in the inner core and the outer layer wholly or partly surrounding the inner core comprise copper wires or copper conductors.

12. The device of claim 8, wherein the depth that the lining tube or pipe extends is at least 36 m.

13. The device of claim 1, where in the installation comprises at least one of a low tension current type installation, a high tension current type installation, a high voltage type installation, an antenna installation, and a teleinstallation.

14. The device of claim 1, wherein the one or more cables extend throughout the bore to contact water in the bore.

15. The device of claim 1, wherein the bore comprises a lining tube that is electrically connected to the ground conductor or the ground conductors.

16. The device as claimed in claim 1, wherein a number of the thin conductors is more than twenty times a number of the coarse conductors.

17. The device as claimed in claim 1, wherein the coarse conductors of a single outer layer of said at least one outer layer wholly surround the hundreds of the thin conductors of said at least one inner core.

* * * * *